United States Patent
Easton

(10) Patent No.: US 6,208,922 B1
(45) Date of Patent: Mar. 27, 2001

(54) TRACKED VEHICLE CLOSED LOOP STEERING SYSTEM

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/456,702

(22) Filed: Dec. 9, 1999

(51) Int. Cl.$^7$ ........................................... B62D 11/02
(52) U.S. Cl. ..................... 701/41; 701/50; 180/6.44; 180/6.48
(58) Field of Search ................... 701/41, 42, 50; 180/6.2, 6.44, 6.48, 6.5, 9.44, 6.7

(56) References Cited

U.S. PATENT DOCUMENTS

| | | | |
|---|---|---|---|
| 4,086,767 | * 5/1978 | Byers, Jr. ............................. | 180/6.48 |
| 4,280,579 | * 7/1981 | Zaunberger ......................... | 180/6.44 |
| 4,890,508 | * 1/1990 | Zaunberger ......................... | 180/6.44 |
| 5,473,541 | * 12/1995 | Ishino et al. ........................ | 180/6.7 |
| 5,477,455 | * 12/1995 | Ishino et al. ........................ | 180/6.44 |
| 5,611,405 | * 3/1997 | Ishino et al. ........................ | 180/6.44 |
| 5,921,335 | * 7/1999 | Straetker ............................. | 701/41 |
| 5,948,029 | 9/1999 | Straetker ............................. | 701/41 |
| 6,000,490 | 12/1999 | Easton .................................. | 180/402 |
| 6,039,132 | * 3/2000 | Easton .................................. | 701/41 |
| 6,138,782 | * 10/2000 | Anderson et al. .................. | 701/41 |

* cited by examiner

Primary Examiner—Gary Chin

(57) ABSTRACT

A control system is provided for a tracked vehicle drive/steering system which has an engine driven hydraulic steering pump which drives a hydraulic steering motor. The steering pump is responsive to steering pump control signals, and an operator manipulated steering wheel generates steering command signals. A steering motor provides an input to a differential track drive mechanism which responds to manipulation of the steering wheel and drives left and right tracks, turning the vehicle. The control system includes a steering wheel position sensor, a steering motor position sensor and a wheel speed sensor. The control system generates a motor displacement value as a function of the steering wheel position and the wheel speed. The control system also generates a motor target position value as a function of the motor displacement, and generates a motor desired position value as a function of the target position value. The control system also generates a motor position error value as a function of the desired position value and of the actual steering motor position signals, and generates the steering pump control signals as a function of the steering motor position error signals.

13 Claims, 5 Drawing Sheets

TRACKED VEHICLE CLOSED LOOP STEERING SYSTEM

BACKGROUND OF THE INVENTION

The present invention relates to a tracked vehicle drive/steering system.

On most known production tracked vehicles, the turning rate of the vehicle is related to the angular position of a spring centered steering wheel or similar operator control. In such systems, the position of the steering wheel provides an indication to the operator of the steering status of the vehicle. However, such systems do not compensate for changes in vehicle operating characteristics consequential to ground conditions, engine speed variations, changes in vehicle mass, changes in vehicle weight distribution, changes in implements attached to the vehicle or changes in the components of the vehicle steering system, such as fluid leakage. It would be desirable to have a steering control system which compensates for such changes.

SUMMARY OF THE INVENTION

Accordingly, an object of this invention is to provide a steering control system which compensates for various changes in conditions or system components.

These and other objects are achieved by the present invention, wherein a control system is provided for a tracked vehicle drive/steering system which has an engine driven hydraulic steering pump which drives a hydraulic steering motor. The steering pump is responsive to steering pump control signals, and an operator manipulated steering wheel generates steering command signals. A steering motor provides an input to a differential track drive mechanism which responds to manipulation of the steering wheel and drives left and right tracks, turning the vehicle. The control system includes a steering wheel position sensor, a steering motor position sensor and a wheel speed sensor. The control system generates a motor displacement value as a function of the steering wheel position and the wheel speed. The control system also generates a motor target position value as a function of the motor displacement, and generates a motor desired position value as a function of the target position value. The control system also generates a motor position error value as a function of the desired position value and of the actual steering motor position signals, and generates the steering pump control signals as a function of the steering motor position error value.

DESCRIPTION OF THE PREFERRED EMBODIMENT

Figure 1:
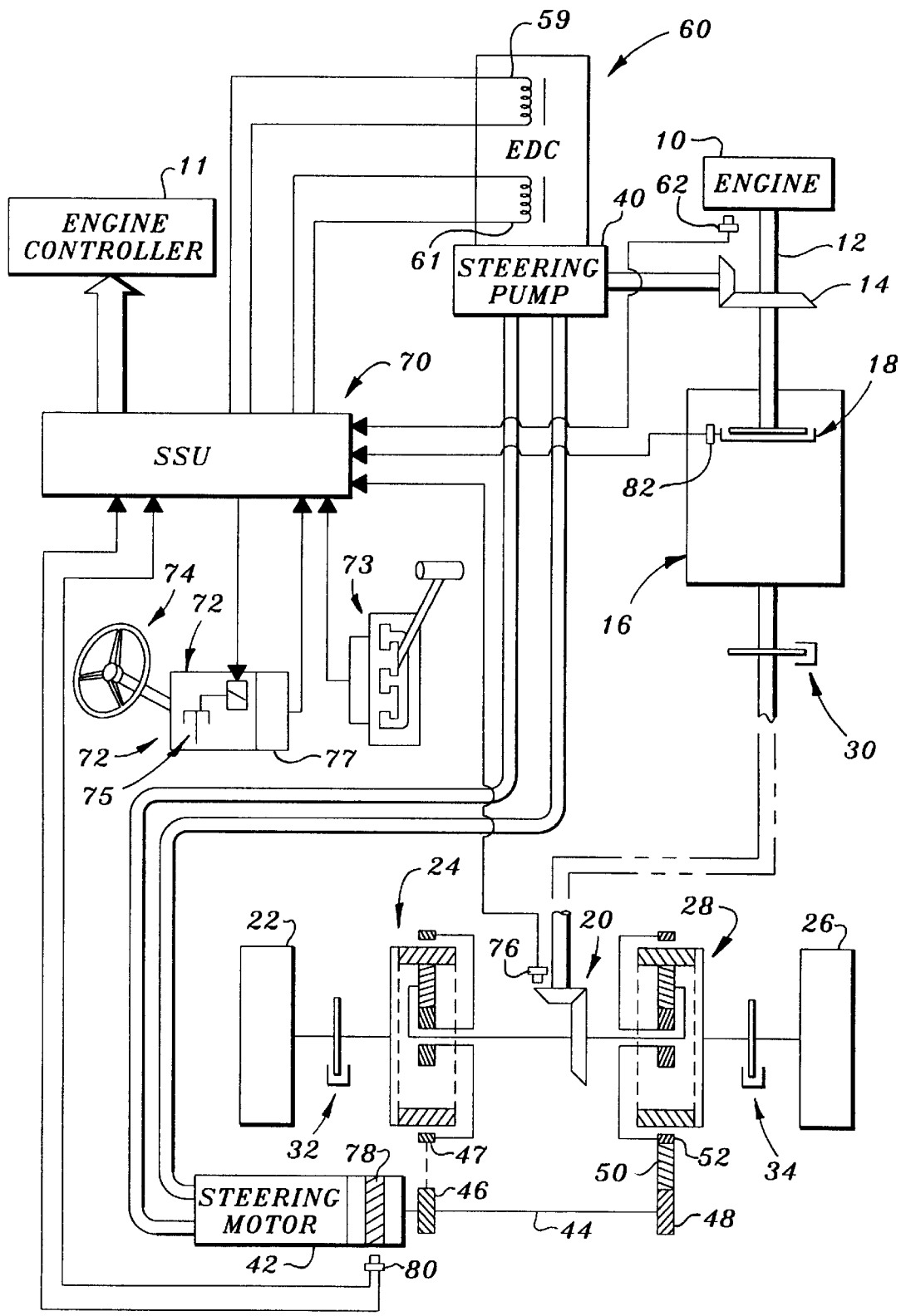
FIG. 1 is a simplified schematic diagram of a tracked vehicle drive and the control system of the present invention.

Referring to FIG. 1, an engine 10 of a tracked vehicle has an output shaft 12 which drives a right angle gear 14 and a transmission 16, such as a 16-speed powershift transmission which is available on production John Deere 8000T tractors. The transmission 16 includes hydraulically operated clutches and brakes (not shown), various ones of which will operate as a main clutch 18 in response to a conventional clutch pedal and linkage (not shown). The engine 10 is controlled by an electronic engine control unit 11. The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000T tractors, are mounted between the steering planetaries and the respective drive wheels, but are not further described because they are not directly involved in the subject matter of this application. A parking brake 30 is coupled to the output shaft of transmission 16, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The steering pump 40 has a swashplate (not shown), the position of which is controlled by a swashplate control valve or electronic displacement control (EDC) 60. The EDC is preferably a two stage device with first stage including a flapper type valve operated by a pair of solenoids 59, 61, and a second stage including a boost stage to the pump, such as is used on the production John Deere 8000T Series tracked tractor.

An engine speed sensor 62, such as a commercially available mag pickup, provides an engine speed signal to a steering system unit (SSU) 70. The solenoids 59, 61 of valve 60 are controlled by pulse-width-modulated (PWM) pump control signals generated by SSU 70. The SSU 70 is communicated with the engine control unit 11.

An operator controlled steering wheel 74 is preferably connected to a non-spring centered input mechanism 72, such as described in U.S. patent application Ser. No. 09/991,961, filed Dec. 17, 1997, and assigned to the assignee of the present application. The input mechanism 72 includes an electro-magnetically controlled friction device or brake 75 and a rotary position transducer or incremental encoder 77, such as a commercially available Grayhill Series 63R encoder or an OakGrigsby 900 Optical Encoder. The encoder 77 provides to SSU 70 a steering wheel position signal representing the position of operator controlled steering wheel 74. The encoder 77 generates a plurality, preferably 128, of pulses per each revolution of the steering wheel 74. The SSU 70 then repeatedly generates and updates a COUNT value representing the number of optical encoder pulses corresponding to the actual position of the steering wheel 74 relative to the position of the steering wheel 74 at start-up. This description relates to a steering input device with a non-spring centered neutral position, but the present invention could also be applied to a system with a spring-centered steering input device. The SSU 70 also receives signals from gear shift lever transducer 73, such as described in U.S. Pat. No. 5,406,860, issued Apr. 18, 1995 to Easton et al.

A drive line rotation speed sensor 76, preferably a differential Hall-effect speed sensor such as used on production John Deere 8000T tractors, is mounted in proximity to the final drive 20, and provides to the SSU 70 a variable frequency final drive speed or wheel speed signal. A magnetic ring 78 is mounted for rotation with the motor 42, and a Hall-effect transducer 80 mounted near the magnetic ring 78 provides to the SSU 70 an incremental motor position signal and a motor direction signal. A pair of clutch status switches 82 are located within the transmission 16 and are operatively associated with the linkage (not shown) between the clutch pedal (not shown) and the main clutch 18, and provide a clutch status signal to the SSU 70.

Figure 2A:
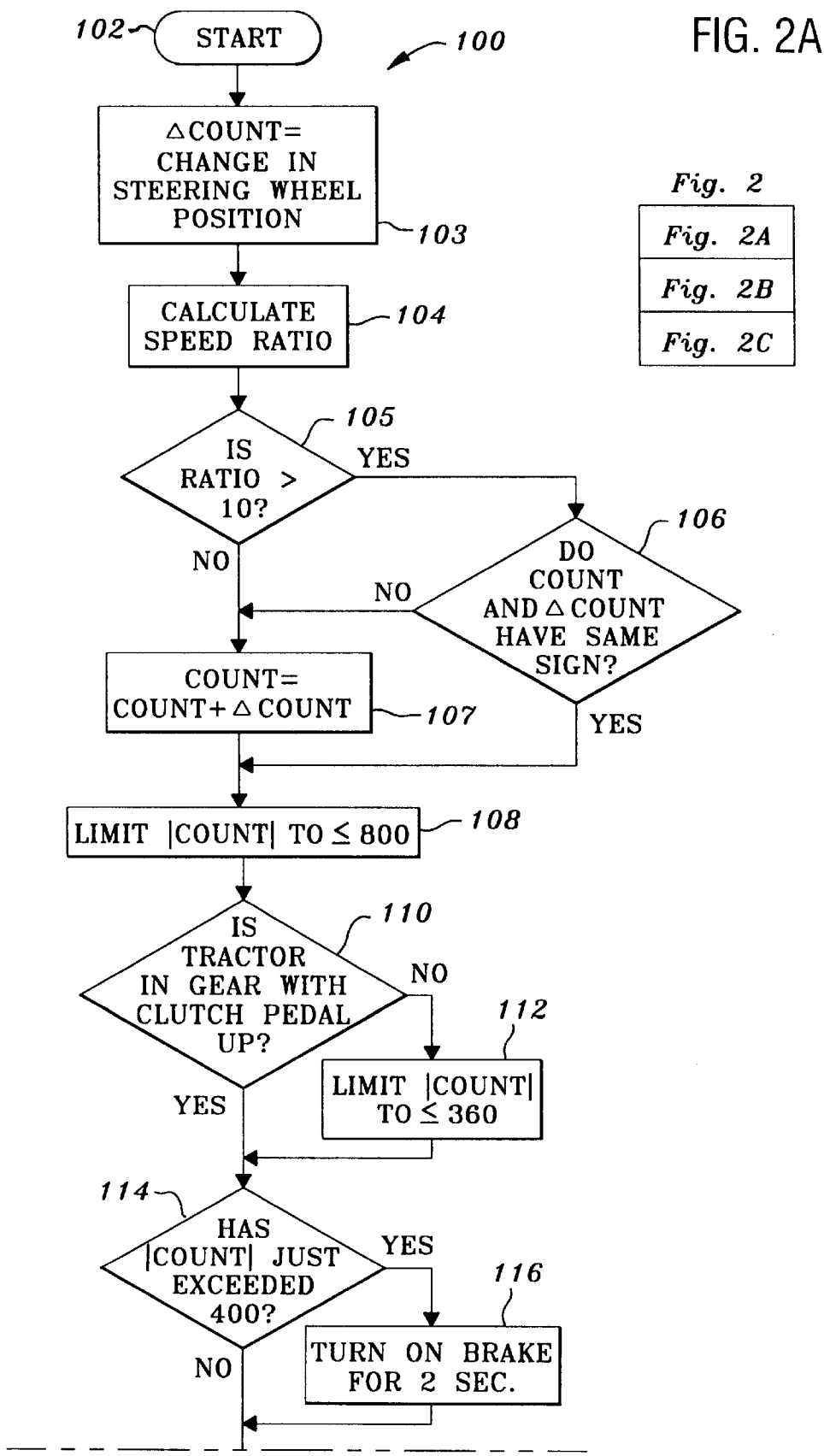
FIGS. 2A, 2B and 2C form a logic flow diagram of an algorithm executed by a microprocessor-based control unit of the control system of FIG. 1.
Figure 2B:
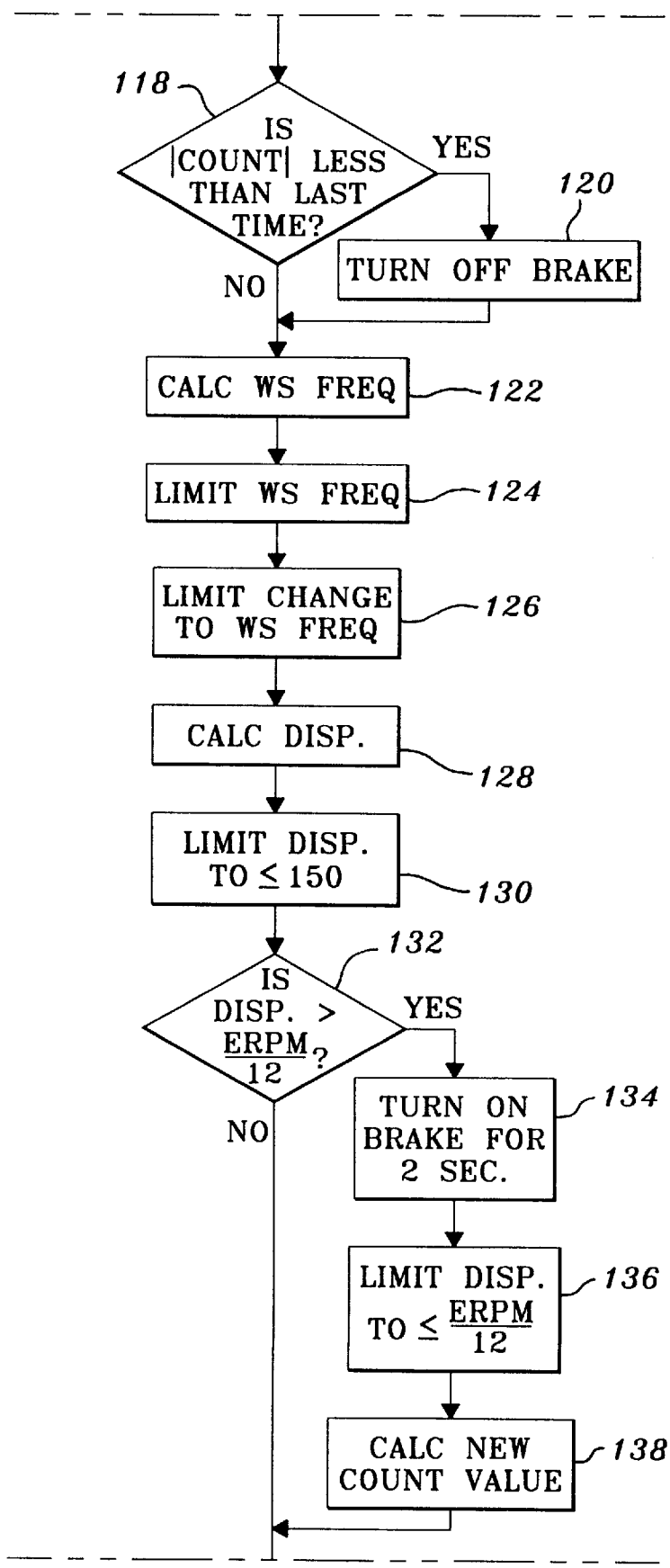
Figure 2C:
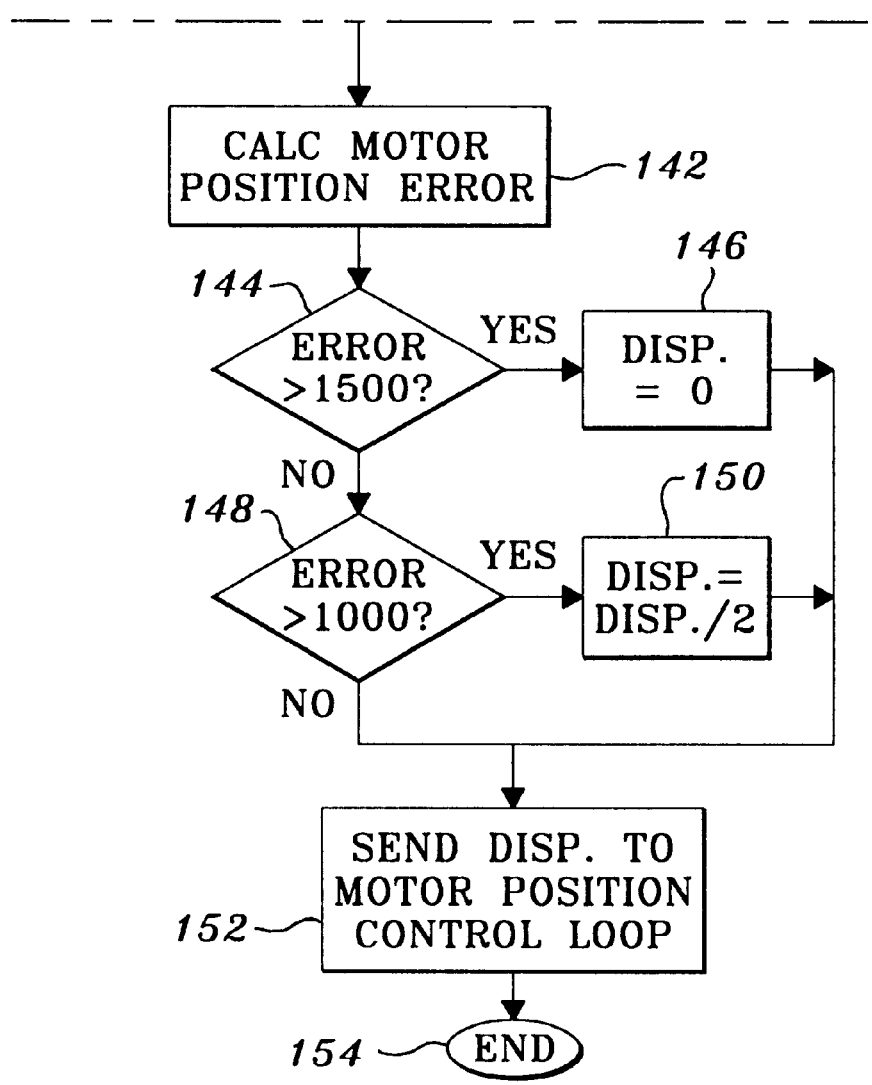
Figure 3:
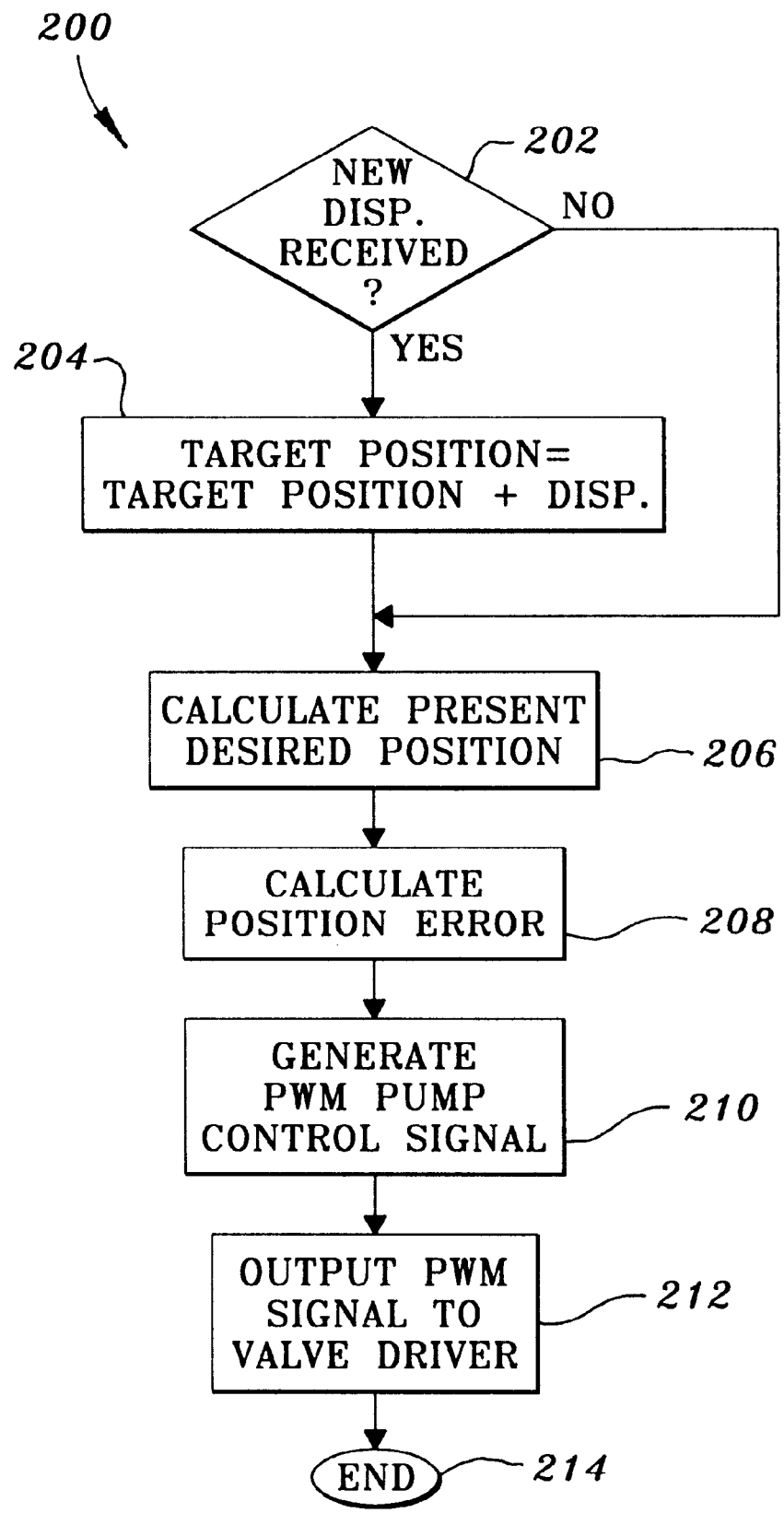
FIG. 3 is a logic flow diagram of a motor position control algorithm executed by a microprocessor-based control unit of the control system of FIG. 1.

The SSU 70 includes a commercially available microprocessor (not shown) which, every 20 milliseconds, executes an algorithm or loop 100 which is illustrated by FIGS. 2A and 2B. The SSU 70 also executes, preferably every 5 milliseconds, a motor control algorithm or loop 200 which is illustrated by FIG. 3. The conversion of these flow charts into a standard language for implementing the algorithms described by the flow charts in a digital computer or microprocessor, will be evident to one with ordinary skill in the art.

The algorithm 100 is entered at step 102. Step 103 fetches a ΔCOUNT value which is the sum of positive and negative pulses from the steering wheel position encoder 77 since the last time loop 100 was executed. (The COUNT value is the sum of all incremental position changes of the steering wheel 74, since start-up, as indicated by the incremental steering wheel position encoder 77.) Step 104 calculates a speed ratio value RATIO by dividing the speed of steering motor 42 (from sensor 80) by the wheel speed from sensor 76. If the speed ratio value RATIO is not greater than a threshold, such as 10 (indicating the vehicle is not in a sharp turn), then step 105 directs execution to step 107.

If the speed ratio value RATIO is greater than the threshold (indicating the vehicle is in a sharp turn), then step 105 directs execution to step 106. Step 106 directs execution to step 107 if COUNT and ΔCOUNT do not have the same sign, else to step 108.

Step 107 sets the current COUNT value equal to the old COUNT value plus ΔCOUNT, so that the COUNT value will accurately represent the movement of the steering wheel 74.

Step 108 limits the absolute value of COUNT to be not greater than 800. Thus, no matter how much the steering wheel 74 is rotated from its initial startup/centered position, it can be returned to back to a position for which the count value will be zero (representing a no-turn, centered position) with no more than approximately than 3 full rotations, since 800 is slightly more than 3 times the number of COUNT increments per a single 360 degree rotation of the steering wheel 74.

Steps 110 and 112 limit the absolute value of COUNT to not greater than 360 if the vehicle transmission 16 is not in gear or the clutch 18 is not engaged, otherwise, the algorithm proceeds to step 114. Thus, if the vehicle transmission 16 is in gear while the clutch 18 is engaged, then vehicle motion is known to be controlled by the power train, otherwise, limiting the absolute value of COUNT to not more than 360 will prevent steering sustained motion.

Steps 114 and 116 operate to turn on the brake 75 of steering wheel input device 72 for approximately 2 seconds the first time the absolute value of COUNT exceeds 400 (representing rotation of the steering wheel 74 of slightly more than 1.5 revolutions from its startup/centered position), otherwise, the algorithm proceeds to step 118. This increases the resistance of the steering wheel 74 to turning and gives the operator feedback that the steering wheel 74 has been turned a substantial amount from its centered position, and that the vehicle is in a rather severe or sharp turning mode. This application of brake 75 also simulates a mechanical steering wheel stop, yet it does not entirely prevent further turning of the steering wheel 74. After step 116 is activated by step 114, step 114 will not trigger step 116 again until the absolute value of COUNT has decreased to below 400 and then increased again to more than 400.

Steps 118 and 120 operate to turn off the brake 75 if the absolute value of COUNT is less than its previous value, otherwise, the algorithm proceeds to step 122. This assures that the brake 75 does not interfere with the returning of the steering wheel 74 to its centered or startup position.

Step 122 calculates a wheel speed frequency value, WSFREQ, from the signal from wheel speed sensor 76, and step 124 limits this wheel speed frequency value to not greater than 250 Hz, which corresponds to a wheel speed of about 11.7 kilometers per hour (km/h). The result is that the steering system will have a reduced steering gain (reduced responsiveness to turning of the steering wheel 74) as wheel speed increases above that speed.

Step 126 limits the change in the wheel speed frequency value from its previously calculated and stored value to between an increase of 1 Hz and a decrease of 10 Hz. In other words, the wheel speed frequency value is allowed to increase by no more than 1 Hz each time the loop 100 is executed, and is allowed to decrease by a maximum of 10 Hz each time the loop 100 is executed. Limiting the change in this value reduces the possibility of sudden severe turns. For example, if the vehicle speed suddenly increases, the speed of the steering motor 42 will still increase only gradually. This also helps protect against the consequences of a spuriously erroneous wheel speed value. The faster decrease limit exceeds the rate by which wheel speed can be decreased by application of the brakes 32, 34, so as to prevent momentary sustained steering after hard braking to zero speed.

Step 128 calculates a displacement value, DISP, according to the following equation, DISP=[(COUNT×WSFREQ)÷500]+(3×ΔCOUNT). The DISP value represents a desired amount of change of the steering motor 42 position at the end of the current algorithm cycle. Thus, the desired amount of change in the position of steering motor 42, DISP, is a function of the position of the steering wheel 74 (COUNT), the wheel speed (WSFREQ) and the change in the steering wheel position (ΔCOUNT). Step 130 limits DISP to not greater than 150.

Step 132 directs the algorithm to step 142 without calculating a new COUNT value, if DISP is not greater than the engine rpm divided by a constant, such as 12. Step 132 directs the algorithm to steps 134–138 if DISP is greater than the engine rpm divided by a constant, such as 12. Step 134 turns on the brake 75 for approximately 2 seconds. Step 136 limits DISP to not greater than the engine rpm divided by 12. Step 138 calculates and stores a new COUNT value, according to the following equation, COUNT=(DISP×500)÷WSFREQ). From step 138, the algorithm proceeds to step 142.

Step 142 calculates a motor position error value, ERROR, by subtracting an actual motor position value from a desired position value. The actual position value is fetched from an accumulator (not shown) which is updated according to the incremental position and rotation direction signals from sensor 80. The desired position value is initially the same as the actual position value, and is thereafter determined by a position/velocity profile generator subroutine which is executed as part of the motor control loop 200 described below.

Steps 144 and 146 operate to set DISP equal to zero and direct the algorithm to step 152 if ERROR is greater than 1500. Steps 148 and 150 operate to set DISP equal to DISP/2 and direct the algorithm to step 152 if ERROR is greater than 1000. Otherwise, steps 144 and 148 direct the algorithm to step 152 without modifying the DISP value if ERROR is not greater than 1000. Thus, steps 144–150 operate to limit the position error value to prevent too large a position error value (such as might result from a component failure or an overload situation) from building up and causing an overly aggressive turning upon recovery from the failure or overload condition.

Step 152 sends the displacement value, DISP, to the motor position control loop 200, after which the algorithm 100 ends at step 154.

Referring now to FIG. 3, the motor control loop 200 is basically a software emulation of a commercially available precision motion controller IC, such as an LM629, made by National Semiconductor Corporation. Loop 200 begins at step 202 which directs the loop to step 204 if a new DISP value has been received from loop 100 since last time through loop 200. If no new displacement value, DISP, has been received from loop 100, step 202 directs the algorithm to step 206. Step 204 calculates a steering motor target position value, TPOS, as equal to the current value of TPOS (initially zero upon startup) plus DISP.

Step 206 then calculates a present desired motor position value using the steering motor target position value, TPOS, and using a position/velocity profile generator function as is known from the LM629 and using acceleration and velocity limits. These limits are determined empirically according to tractor steering performance. The velocity limit allows the loop to function properly with a motor which has a limited speed capability. This limit is preferably updated every 20 msec, the value being linearly dependent on engine speed (velocity limit=engine speed×a scalar).

The acceleration limit is selected according to how fast it is desired to have the motor change its speed. Excess acceleration can lead to operator discomfort, and insufficient acceleration reduces the steering responsiveness. This limit is preferably determined empirically, and is not thereafter adjustable.

Step 208 then calculates a position error value by subtracting an actual position value from the desired position value determined in step 206. The actual position value is the sum of all incremental position changes, since start-up, as indicated by the incremental motor position sensor 80. Step 210 then uses the position error value from step 208 to generate PWM steering pump control signals according to a known proportional-integral-differential (PID) function, such as used in the aforementioned LM629. Step 212 outputs the PWM pump control signals to valve drivers (not shown) for the solenoids 59 and 61 of the steering pump swashplate control valve 60.

Each time loop 200 is executed, it calculates a new desired motor position as a function of the target position, the present desired position and velocity, and the two limits. This desired position is compared to the actual position, generating the position error value. Finally, the PID function represented by step 210 operates pump solenoids 59, 61 to minimize the position error value.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a tracked vehicle drive/steering system having an engine driven hydraulic steering pump which drives a hydraulic steering motor, the steering pump being responsive to steering pump control signals, an operator manipulated steering wheel for generating steering command signals, the steering motor providing an input to a differential track drive mechanism which responds to manipulation of the steering wheel and turns the vehicle and drives left and right tracks, the control system comprising:

a steering wheel position sensor which generates steering wheel position signals; a steering motor position sensor which generates actual steering motor position signals;

a wheel speed sensor which generates wheel speed signals;

a motor displacement value generator which generates a motor displacement value as a function of the steering wheel position signal and the wheel speed signals;

a motor target position value generator which generates a motor target position value as a function of the motor displacement value;

a motor desired position value generator which generates a motor desired position value as a function of the target position value;

a motor position error generator which generates a motor position error value as a function of the desired position value and of the actual steering motor position signals; and a steering pump control signal generator which generates the steering pump control signals as a function of the steering motor position error signals.

2. The control system of claim 1, wherein:

the steering wheel is coupled to a non-spring centered input mechanism which comprises a controllable brake device for varying a force required to turn the steering wheel; and a brake controller applies the brake device if the motor displacement value is greater than a motor displacement threshold value.

3. The control system of claim 2, further comprising:

a motor displacement value limiter for limiting the motor displacement value to the threshold value.

4. The control system of claim 1, wherein:

an engine speed sensor periodically generates an engine speed value;

the steering wheel is coupled to a non-spring centered input mechanism which comprises a controllable brake device for varying a force required to turn the steering wheel; and a brake controller applies the brake device if the motor displacement value is greater than a motor displacement threshold value, the motor displacement threshold value being equal to the engine speed value divided by a constant.

5. The control system of claim 4, further comprising:

a motor displacement value limiter for limiting the motor displacement value to the threshold value.

6. The control system of claim 1, further comprising:

a steering wheel position signal magnitude limiter for limiting an absolute value of the steering wheel position signal to a limit value representing a desired maximum amount of rotation of the steering wheel from a startup position.

7. The control system of claim 1, wherein:

the vehicle comprises a transmission and a clutch between the engine and the differential track drive mechanism; and the control system further comprises a steering wheel position signal magnitude limiter for limiting an absolute value of the steering wheel position signal to a limit value if the transmission is not in gear or the clutch is not engaged, to prevent steering sustained motion.

8. The control system of claim 1, wherein:

the steering wheel is coupled to a non-spring centered input mechanism which comprises a controllable brake device for varying a force required to turn the steering wheel; and a brake controller responsive to the steering wheel position signal, momentarily applies the brake device if the steering wheel is rotated more than a certain amount away from its startup position.

9. The control system of claim 8, wherein:

a brake deactivator responsive to the steering wheel position signal which immediately deactivates the brake device if the steering wheel is rotated back to a position less than said certain amount away from its startup position.

10. The control system of claim 1, further comprising:

a wheel speed signal limiter for limiting a magnitude of the wheel speed signal to a certain wheel speed value in order to control system reduced responsiveness to turning of the steering wheel at wheel speeds above said certain wheel speed value.

11. The control system of claim 1, further comprising:

a displacement value limiter for modifying a magnitude of the displacement value if the motor position error value is greater than a threshold value.

12. The control system of claim 1, further comprising:

a first displacement value limiter for setting a magnitude of the displacement value to zero if the motor position error value is greater than a first threshold value; and a second displacement value limiter for reducing a magnitude of the displacement value if the motor position error value is greater than a second threshold value.

13. The control system of claim 12, wherein:

the first threshold value is greater than the second threshold value.

\* \* \* \* \*